(12) United States Patent
Crabtree et al.

(10) Patent No.: US 11,314,764 B2
(45) Date of Patent: *Apr. 26, 2022

(54) AUTOMATED SCALABLE CONTEXTUAL DATA COLLECTION AND EXTRACTION SYSTEM

(71) Applicant: QOMPLX, Inc., Tysons, VA (US)

(72) Inventors: Jason Crabtree, Vienna, VA (US); Andrew Sellers, Monument, CO (US)

(73) Assignee: QOMPLX, INC., Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/919,231

(22) Filed: Jul. 2, 2020

(65) Prior Publication Data

US 2021/0056117 A1 Feb. 25, 2021

Related U.S. Application Data

(63) Continuation of application No. 15/905,041, filed on Feb. 26, 2018, now Pat. No. 10,706,063, which is a continuation-in-part of application No. 15/237,625, filed on Aug. 15, 2016, now Pat. No. 10,248,910, which is a continuation-in-part of application No.
(Continued)

(51) Int. Cl.
| | |
|---|---|
| *G06F 16/25* | (2019.01) |
| *G06F 16/901* | (2019.01) |
| *H04L 29/06* | (2006.01) |
| *G06N 5/02* | (2006.01) |
| *G06N 3/04* | (2006.01) |
| *G06F 21/62* | (2013.01) |
| *G06N 20/00* | (2019.01) |
| *G06N 5/04* | (2006.01) |

(52) U.S. Cl.
CPC ......... *G06F 16/254* (2019.01); *G06F 16/258* (2019.01); *G06F 16/9024* (2019.01); *G06N 5/022* (2013.01); *H04L 63/0421* (2013.01); *G06F 21/6218* (2013.01); *G06N 3/0454* (2013.01); *G06N 5/046* (2013.01); *G06N 20/00* (2019.01)

(58) Field of Classification Search
USPC .......... 726/23, 2, 21, 36; 713/150, 163, 181; 380/255, 264, 276
See application file for complete search history.

(56) References Cited

U.S. PATENT DOCUMENTS

| | | | | |
|---|---|---|---|---|
| 7,171,515 B2* | 1/2007 | Ohta | ................... | G06F 12/0862 711/113 |
| 7,853,582 B2* | 12/2010 | Gopalakrishnan | .... | G06F 16/583 707/708 |

(Continued)

*Primary Examiner* — Sharif E Ullah
(74) *Attorney, Agent, or Firm* — Galvin Patent Law LLC; Brian R. Galvin; Brian S. Boon

(57) ABSTRACT

A system for contextual data collection and extraction is provided, comprising an extraction engine configured to receive context from a user for desired information to extract, connect to a data source providing a richly formatted dataset, retrieve the richly formatted dataset, process the richly formatted dataset and extract information from a plurality of linguistic modalities within the richly formatted, and transform the extracted data into a extracted dataset; and a knowledge base construction service configured to retrieve the extracted dataset, create a knowledge base for storing the extracted dataset, and store the knowledge base in a data store.

16 Claims, 12 Drawing Sheets

Related U.S. Application Data

15/206,195, filed on Jul. 8, 2016, which is a continuation-in-part of application No. 15/186,453, filed on Jun. 18, 2016, which is a continuation-in-part of application No. 15/166,158, filed on May 26, 2016, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned.

(56) References Cited

U.S. PATENT DOCUMENTS

| | | | |
|---|---|---|---|
| 9,253,015 B2 * | 2/2016 | Girard | H04L 29/0818 |
| 10,216,485 B2 | 2/2019 | Misra et al. | |
| 2005/0000165 A1 * | 1/2005 | Dischinat | E06B 7/23 |
| | | | 49/496.1 |
| 2011/0119613 A1 * | 5/2011 | Zhu | G06F 16/951 |
| | | | 715/771 |
| 2014/0359552 A1 * | 12/2014 | Misra | G06F 8/60 |
| | | | 717/100 |
| 2016/0006629 A1 * | 1/2016 | Ianakiev | G06F 21/32 |
| | | | 709/224 |
| 2018/0039890 A1 * | 2/2018 | Kim | G06F 16/9027 |

\* cited by examiner

AUTOMATED SCALABLE CONTEXTUAL DATA COLLECTION AND EXTRACTION SYSTEM

CROSS-REFERENCE TO RELATED APPLICATIONS

| Application No. | Date Filed | Title |
|---|---|---|
| Current application | Herewith | AUTOMATED SCALABLE CONTEXTUAL DATA COLLECTION AND EXTRACTION SYSTEM |
| | | Is a continuation of: |
| 15/905,041 | Feb. 26, 2018 | AUTOMATED SCALABLE CONTEXTUAL DATA COLLECTION AND EXTRACTION SYSTEM |
| | | which is a continuation-in-part of: |
| 15/237,625 Patent: 10,248,910 | Aug. 15, 2016 Issue Date: Apr. 2, 2019 | DETECTION MITIGATION AND REMEDIATION OF CYBERATTACKS EMPLOYING AN ADVANCED CYBER-DECISION PLATFORM |
| | | which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE |
| | | which is a continuation-in-part of: |
| 15/186,453 | Jun. 18, 2016 | SYSTEM FOR AUTOMATED CAPTURE AND ANALYSIS OF BUSINESS INFORMATION FOR RELIABLE BUSINESS VENTURE OUTCOME PREDICTION |
| | | which is a continuation-in-part of: |
| 15/166,158 | May 26, 2016 | SYSTEM FOR AUTOMATED CAPTURE AND ANALYSIS OF BUSINESS INFORMATION FOR SECURITY AND CLIENT-FACING INFRASTRUCTURE RELIABILITY |
| | | which is a continuation-in-part of: |
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION |
| | | which is a continuation-in-part of: |
| 15/091,563 Patent: 10,204,147 | Apr. 5, 2016 Issue Date: Feb. 12, 2019 | SYSTEM FOR CAPTURE, ANALYSIS AND STORAGE OF TIME SERIES DATA FROM SENSORS WITH HETEROGENEOUS REPORT INTERVAL PROFILES |
| | | and is also a continuation-in-part of: |
| 14/986,536 Patent: 10,210,255 | Dec. 31, 2015 Issue Date: Feb. 19, 2019 | DISTRIBUTED SYSTEM FOR LARGE VOLUME DEEP WEB DATA EXTRACTION |
| | | and is also a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH | the entire specification of each of which is incorporated herein by reference.

BACKGROUND OF THE INVENTION

Field of the Invention

The disclosure relates to the field of automated data extraction, particularly to extraction of data from richly formatted data across different modalities while preserving the context of the data.

Discussion of the State of the Art

Richly formatted data continues to pose a problem to the field of machine learning. While unstructured text may be analyzed using natural language processing models without heeding to the overall structure of the body of text, the structure and layout of richly formatted text may be as important to the context as the content itself. Another problem encountered when processing richly formatted data with machine learning is the multimodal nature of the data, for example, images, audio, and video may exist as supplementary data.

What is needed is a system that can take gather multimodal data, whether it is richly formatted data or unstructured data, and process the gathered data, all the while preserving the context of the data source that may be inherent in its formatting or its type.

SUMMARY OF THE INVENTION

Accordingly, the inventor has conceived, and reduced to practice, a system and method for automated scalable contextual data collection and extraction.

In a typical embodiment, a contextual data collection and extraction is provided that accesses a plurality of richly formatted data sources, and extracts information based on user-provided context. The system may be configured to work across different modalities, and may even cross-reference information from the different modalities to supplement and enrich data extracted from other modalities. The system may also be configured to store extracted data as data, which may be utilized to analyze phase transitions. In addition to enriching a knowledge base for reference purposes, the system may also collectively analyze the data from multiple sources in context, and act as a Data Loss Prevention monitor to ensure that no data leakage has occurred, that may not have been obvious from singly evaluating the data sources.

In one aspect of the invention, a system for contextual data collection and extraction is provided, comprising an extraction engine comprising a memory, a processor, and a plurality of programming instructions stored in the memory thereof and operable on the processor thereof, wherein the programmable instructions, when operating on the processor, cause the processor to: receive a context target from a user for desired information to extract, connect to a data source providing a richly formatted dataset, retrieve the richly formatted dataset, process the richly formatted dataset and extract information from a plurality of linguistic modalities within the richly formatted dataset relating at least in part to the context provided by the user, and transform the extracted data into a graph and time series-based dataset; and a knowledge base construction service comprising a memory, a processor, and a plurality of programming instructions stored in the memory thereof and operable on the processor thereof, wherein the programmable instructions, when operating on the processor, cause the processor to retrieve the graph and time series-based dataset, create a knowledge base for storing the graph and time series-based dataset, and store the knowledge base in a data store for later reference.

In another embodiment of the invention, a previously created knowledge base is retrieved to store newly extracted information. In another embodiment of the invention, data extracted from a first modality is be used to augment data in a second modality.

In another embodiment of the invention, the system further comprises a proxy connection service comprising a memory, a processor, and a plurality of programming instructions stored in the memory thereof and operable on the processor thereof, wherein the programmable instructions, when operating on the processor, cause the processor to determine that an intermediate proxy connection is required based at least in part on connection status in connecting to a data source. In another embodiment of the invention, the proxy connection service determines an optimal proxy network to use as the intermediate proxy connection based at least on successfully connecting to a target data source.

In another embodiment of the invention, a data marker in labeled data is used by the system to identify and label previously unlabeled similar data. In another embodiment of the invention, the system further comprises a phase transition analyzer comprising a proxy connection service comprising a memory, a processor, and a plurality of programming instructions stored in the memory thereof and operable on the processor thereof, wherein the programmable instructions, when operating on the processor, cause the processor to: retrieve a knowledge base from the data store, and perform a plurality of graph analysis and transformations on the knowledge base to identify data transitions over time. In another embodiment of the invention, a previously created knowledge base is monitored for unwanted data exfiltration.

In another aspect of the invention, a method for contextual data collection and extraction, comprising the steps of: (a) receiving a context target from a user for desired information to extract, using a extraction engine; (b) connecting to a data source providing a richly formatted dataset, using the extraction engine; (c) retrieving the richly formatted dataset, using the extraction engine; (d) processing the richly formatted dataset and extract information from a plurality of linguistic modalities within the richly formatted dataset relating at least in part to the context provided by the user, using the extraction engine; (e) transforming the extracted data into a graph and time series-based dataset, using the extraction engine; (f) retrieving the graph and time series-based dataset, using a knowledge base construction service; (g) creating a knowledge base for storing the graph and time series-based dataset, using the knowledge base construction service; and (h) storing the knowledge base in a data store for later reference, using the knowledge base construction service.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
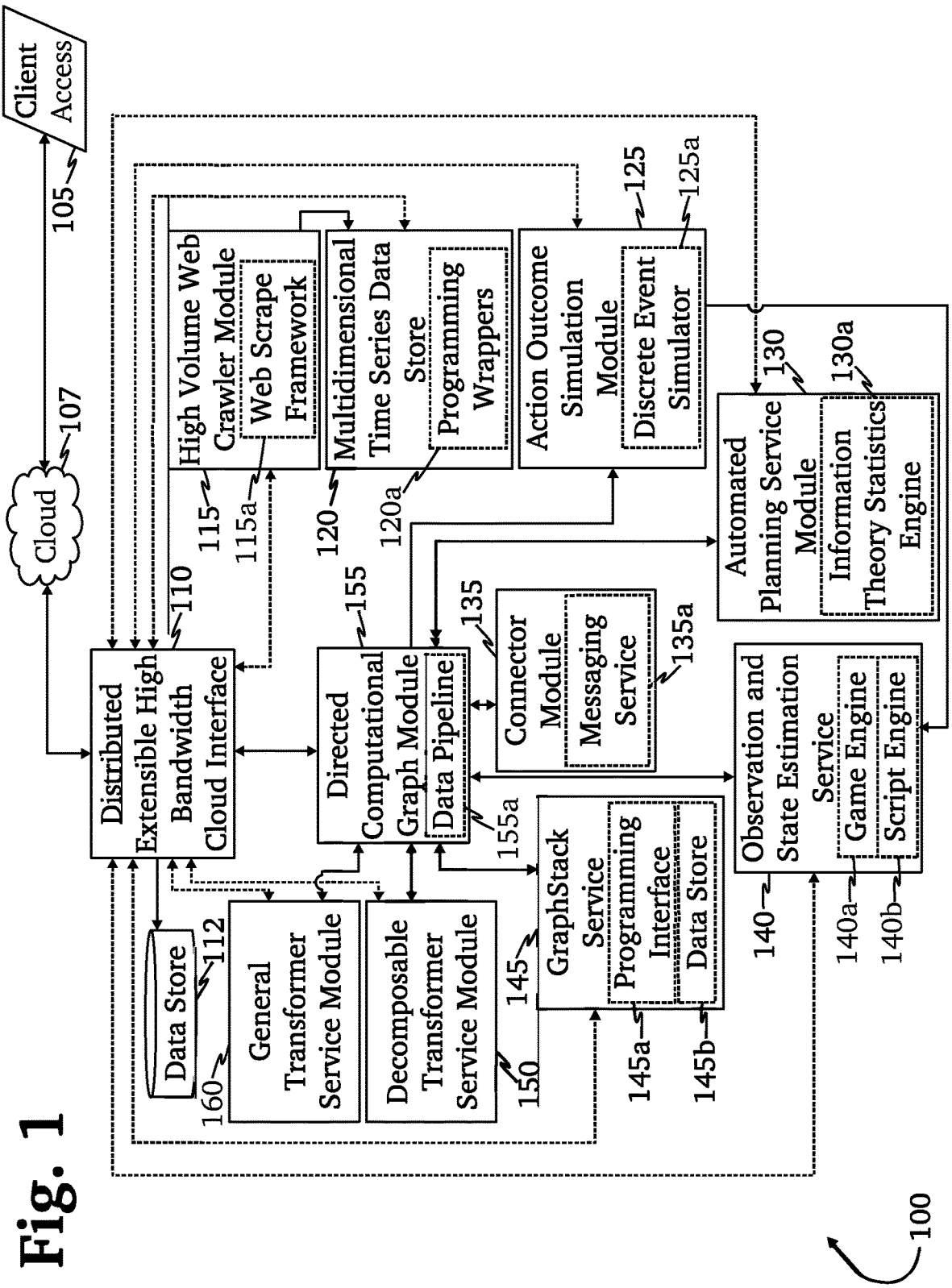
FIG. 1 is a diagram of an exemplary architecture of a business operating system according to an embodiment of the invention.

The inventor has conceived, and reduced to practice, a system and method for contextual data collection and extraction.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a diagram of an exemplary architecture of a business operating system 100 according to an embodiment of the invention. Client access to system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources 107, public or proprietary such as, but not limited to: subscribed business field specific data services, external remote sensors, subscribed satellite image and data feeds and web sites of interest to business operations both general and field specific, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and a graph stack service 145. Directed computational graph module 155 retrieves one or more streams of data from a plurality of sources, which includes, but is not limited to, a plurality of physical sensors, network service providers, web based questionnaires and surveys, monitoring of electronic infrastructure, crowd sourcing campaigns, and human input device information. Within directed computational graph module 155, data may be split into two identical streams in a specialized pre-programmed data pipeline 155a, wherein one sub-stream may be sent for batch processing and storage while the other sub-stream may be reformatted for transformation pipeline analysis. The data may be then transferred to a general transformer service module 160 for linear data transformation as part of analysis or the decomposable transformer service module 150 for branching or iterative transformations that are part of analysis. Directed computational graph module 155 represents all data as directed graphs where the transformations are nodes and the result messages between transformations edges of the graph. High-volume web crawling module 115 may use multiple server hosted preprogrammed web spiders which, while autonomously configured, may be deployed within a web scraping framework 115*a* of which SCRAPY™ is an example, to identify and retrieve data of interest from web based sources that are not well tagged by conventional web crawling technology. Multiple dimension time series data store module 120 may receive streaming data from a large plurality of sensors that may be of several different types. Multiple dimension time series data store module 120 may also store any time series data encountered by system 100 such as, but not limited to, environmental factors at insured client infrastructure sites, component sensor readings and system logs of some or all insured client equipment, weather and catastrophic event reports for regions an insured client occupies, political communiques and/or news from regions hosting insured client infrastructure and network service information captures (such as, but not limited to, news, capital funding opportunities and financial feeds, and sales, market condition), and service related customer data. Multiple dimension time series data store module 120 may accommodate irregular and high-volume surges by dynamically allotting network bandwidth and server processing channels to process the incoming data. Inclusion of programming wrappers 120*a* for languages—examples of which may include, but are not limited to, C++, PERL, PYTHON, and ERLANG™—allows sophisticated programming logic to be added to default functions of multidimensional time series database 120 without intimate knowledge of the core programming, greatly extending breadth of function. Data retrieved by multidimensional time series database 120 and high-volume web crawling module 115 may be further analyzed and transformed into task-optimized results by directed computational graph 155 and associated general transformer service 160 and decomposable transformer service 150 modules. Alternately, data from the multidimensional time series database and high-volume web crawling modules may be sent, often with scripted cuing information determining important vertices 145*a*, to graph stack service module 145 which, employing standardized protocols for converting streams of information into graph representations of that data, for example open graph internet technology (although the invention is not reliant on any one standard). Through the steps, graph stack service module 145 represents data in graphical form influenced by any pre-determined scripted modifications 145*a* and stores it in a graph-based data store 145*b* such as GIRAPH™ or a key-value pair type data store REDIS™, or RIAK™, among others, any of which are suitable for storing graph-based information.

Results of the transformative analysis process may then be combined with further client directives, additional business rules and practices relevant to the analysis and situational information external to the data already available in automated planning service module 130, which also runs powerful information theory-based predictive statistics functions and machine learning algorithms 130*a* to allow future trends and outcomes to be rapidly forecast based upon the current system derived results and choosing each a plurality of possible business decisions. Then, using all or most available data, automated planning service module 130 may propose business decisions most likely to result in favorable business outcomes with a usably high level of certainty. Closely related to the automated planning service module 130 in the use of system-derived results in conjunction with possible externally supplied additional information in the assistance of end user business decision making, action outcome simulation module 125 with a discrete event simulator programming module 125*a* coupled with an end user-facing observation and state estimation service 140, which is highly scriptable 140*b* as circumstances require and has a game engine 140*a* to more realistically stage possible outcomes of business decisions under consideration, allows business decision makers to investigate the probable outcomes of choosing one pending course of action over another based upon analysis of the current available data.

Figure 2:
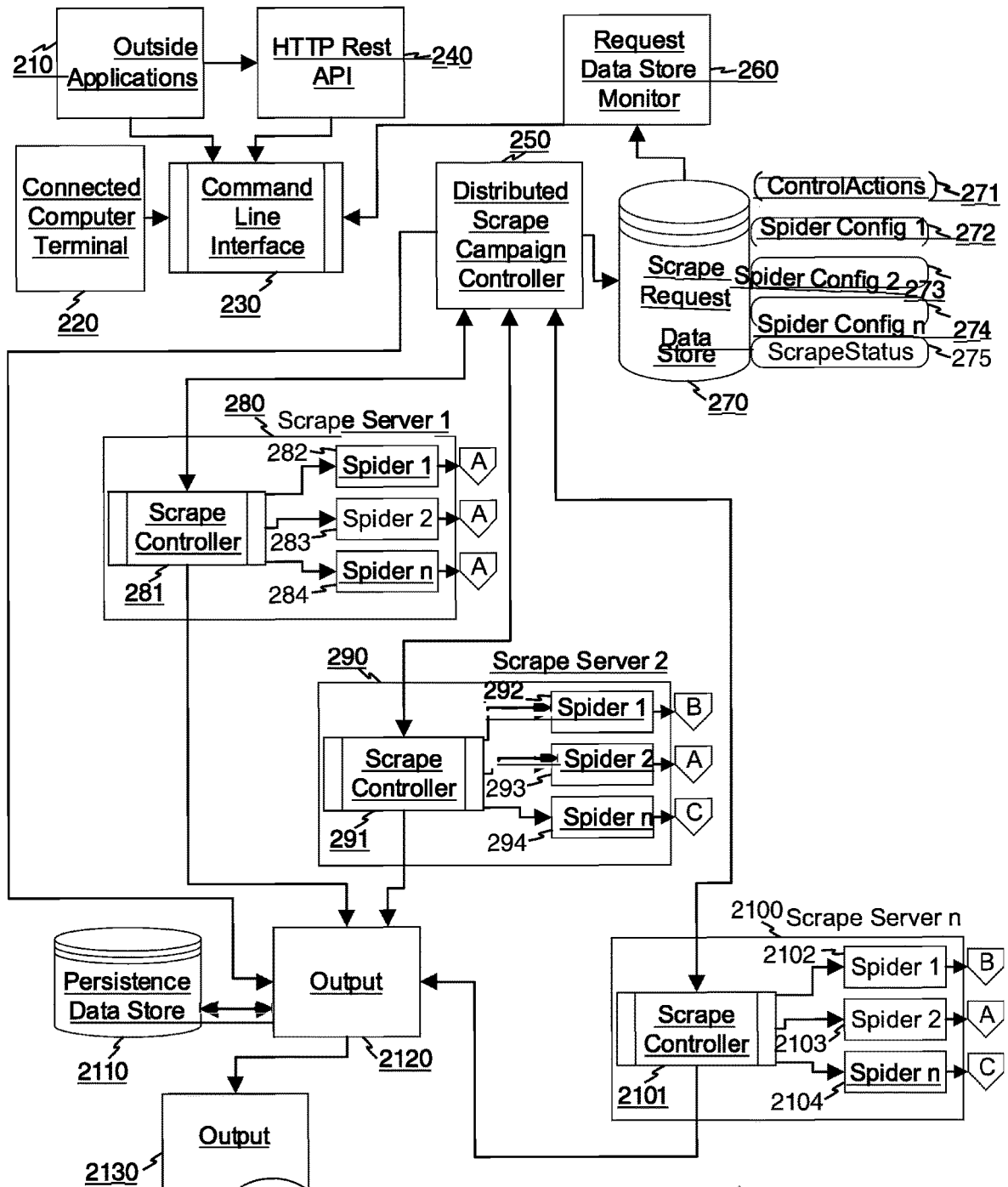
FIG. 2 is a diagram of an exemplary architecture of a distributed system for rapid, large volume, search and retrieval of unstructured or loosely structured information found on sources such as the World Wide Web, according to a preferred embodiment of the invention.

FIG. 2 is a diagram of an exemplary architecture of a distributed system 200 for rapid, large volume, search and retrieval of unstructured or loosely structured information found on sources such as the World Wide Web, according to a preferred embodiment of the invention. According to the embodiment, scrape campaign requests, which are comprised of a plurality of scrape agent (spider) configuration parameters as well as scrape campaign control directives, may be entered from a connected computer terminal 220 or by terminal-like commands issued by external software applications 210 using a built in command line interface 230. Alternatively, similar scrape campaign requests may enter the system through an HTTP REST-based API using JSON-compliant instructions 240. Scrape campaign parameters enter a distributed scrape campaign controller module 250, where they are formalized and stored in a scrape request data store 270 as one or more scrape campaign-related spider configurations 272, 273, 274 and associated scrape campaign control directives 271. Scrape campaigns remain persistently stored until a command to run one or more of them is received through command line interface 230 or HTTP-based API 240, at which time request parameters 271, 272, etc. for a campaign are retrieved by distributed scrape campaign controller module 250 from scrape request data store 270. Persistent storage of scrape campaign request parameters also allows the same scrape campaign to be run multiple times and used as a starting point for design of similar scrape campaigns. Upon receipt of a command to run a specific scrape campaign and retrieval of that scrape campaign's configuration and control parameters, distributed scrape campaign controller module 250 coordinates the scrape campaign in regards to the number of spiders 282, 283, 284 to be used, and the number of distributed scrape servers 280, 290, 2100 to be used based upon the control directives for that campaign. Distributed scrape campaign controller module 250 then sends appropriate instructions to scrape servers 280, 290, 2100 to initiate and run the requested scrape campaign. If there are multiple spider configurations present in a scrape campaign request so as to cause the scraping of multiple web pages or sites, how many spiders to assign to each page and the priority each spider type has for scrape server resources is also coordinated by distributed scrape campaign controller module 250, which directs the scrape servers 280, 290, 2100 accordingly to initiate and run the requested multipage or multisite scrape campaign. Once the data to run a scrape campaign is sent to it, scrape controller module 281, 291, 2101 of each scrape server 280, 290, 2110 executes the required scrapes. Scrape controller module 280 290, 2110 hosts the programming for the spiders into which it loads scrape campaign spider configuration parameters sent to scrape server 280, 290, 2110 from distributed scrape campaign controller module 250 using the co-sent scrape campaign control directives to determine the number of spider instances 282, 283, 284 to create and the resource usage priority each spider is given on the server. It is possible that all spider 282, 283, 284 instances on a given scrape server 280 will be scraping the same web target; however, the invention does not require this and is instead set up to make efficient use of scrape server resources. Therefore, a single scrape server 290; 2110 may execute spiders scraping different web targets 292, 293, 294; 2102, 2103, 2104 and the spiders scraping a single web target 282, 283, 293; 292, 2102; 294, 2103 may be distributed across multiple servers 280; 290; 2100. Scrape controller module 281, 291, 2101 of each scrape server 280, 290, 2100 monitors the progress and operational status of the spiders it has executed and returns that information back to distributed scrape controller module 250. Both the progress and operational data, which may be acquired from a request data store monitor 260, are stored as log data 275 in scrape request store 270 and is made available to the authors of the scrape campaign during its operation, which may result in directives being issued that change one or more aspects of the scrape campaign. The invention is designed to allow such mid-campaign parameter changes without downtime or loss of collected, intermediate, data. Results of the scrapes returned to scrape controller module 281, 291, 2100 by individual spiders 282, 283, 284, 292, 293, 294, 2102, 2103, 2104 are sent to persistence service server 2120, which aggregates the data from individual scrape server spiders 282, 283, 284, 292, 293, 294, 2102, 2103, 2104, and performs any transformations pre-designed by the authors of the scrape campaign prior to outputting the data in a format determined by the authors of the campaign. This may involve sending the output to external software applications 2130 for further processing. The data may also be processed for storage by persistence service server 2120 and sent to a persistence data store for more permanent archival.

It is should be noted that, while the core distributed scrape campaign system distributes load across a pool of scrape servers, coordinates the number of spiders employed within a scrape campaign, and prioritizes allotment of scrape server resources among spiders, it does not internally manage or control spider web page and link follow restrictions, crawling frequencies, and so forth. Individual spiders must implement suitable controls and crawling orchestration (which is external to the distributed scrape campaign system). All of these considerations are part of the scrape campaign spider configuration parameters that are received from the authors of scrape campaigns 210, 220 by distributed scrape campaign controller module 250. This is done to give the authors of the scrape maximal flexibility in the behavior of the spiders during a scrape campaign while allowing the use of a robust yet easily deployed spider programming interface.

Figure 3:
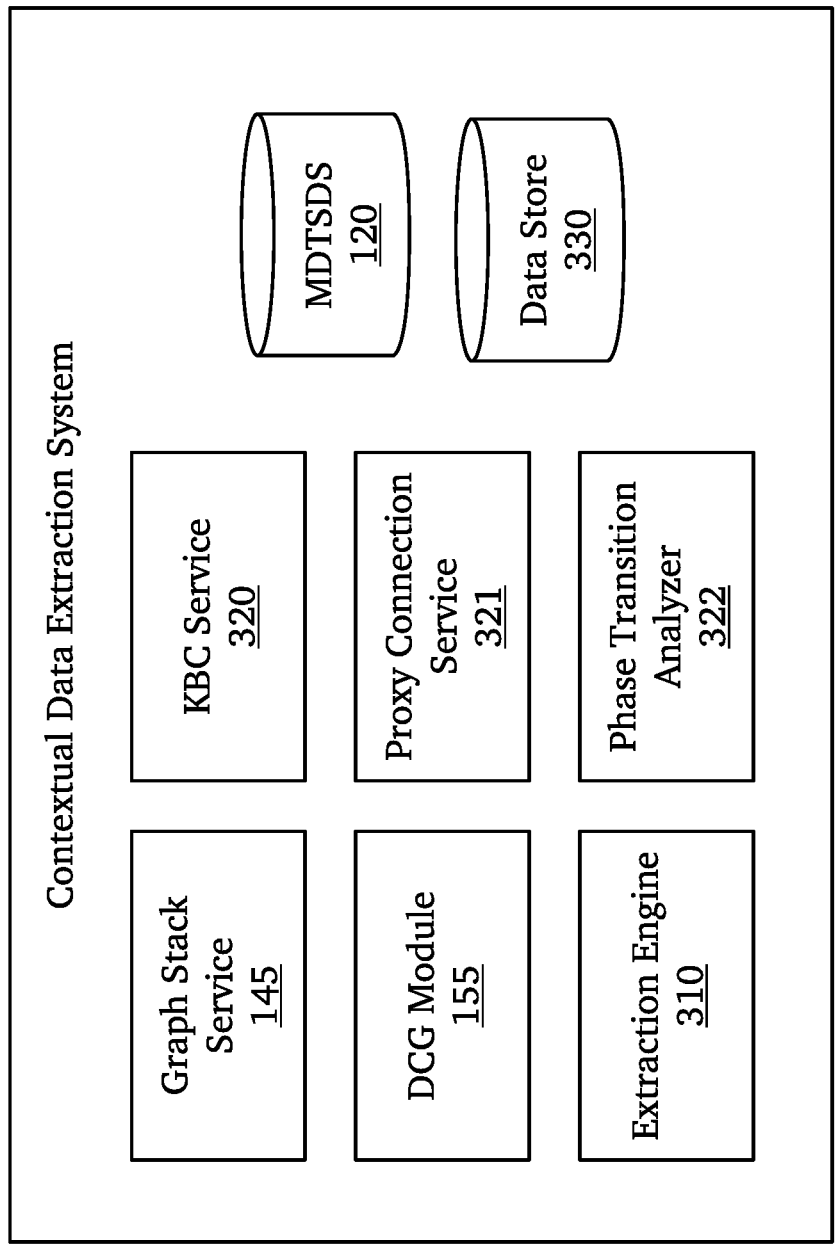
FIG. 3 is a block diagram of an exemplary system for contextual data collection and extraction according to various embodiments of the invention.

Using the techniques for extracting unstructured and loosely structured data discussed above, richly formatted data may also be scraped. However, in order to successfully process the scraped data for useful information, requires additional components. FIG. 3 is a block diagram of an exemplary system 300 for contextual data collection and extraction according to various embodiments of the invention. System 300 may comprise graph stack service 145, directed computational graph (DCG) module 155, an extraction engine 310, knowledge base construction (KBC) service 320, a proxy connection service 321, multidimensional time-series data store (MDTSDS) 120 for collecting and storing graph and time-series, and a data store 330. It should be understood that the components in system 300, although illustrated as enclosed in a single body, the components of system 300 may be implement in logical form, or the functions may be provided as a plurality of distributed microservices.

Extraction engine 310 may be configured to use processes of business operating system 100, such as connector module 135, web crawler 115, and multidimensional time series data store 120 to connect to data sources to extract data, which may be richly formatted data, structured data, unstructured data, and the like. Extraction engine 310 may be configured to not only work across different modalities of data and preserve context across the different modalities, but data extracted from the various modalities may be used to augment data from one modality to another. Extracted data from the same modality from different sources may also be able to augment one another. During the extraction process, extraction engine 310 may take into consideration user-provided context. The context may then be used by extraction engine 310 to refine the types of the data that is extracted. Once data has been extracted, the data may be subjected to external feedback as a means for quality assurance for the extracted data. Some sources are listed below in FIG. 5.

Another capability of extraction engine 310 is tagging extracted data with relevant timestamp data and store the data as time-series data. This may be useful for classifying data in phases so that transitions over time may be captured using graph edge analysis. This may be useful, for example, for tracking development in expert judgement in particular fields overtime, as well as let interested parties explore data from specific time periods.

Figure 4:
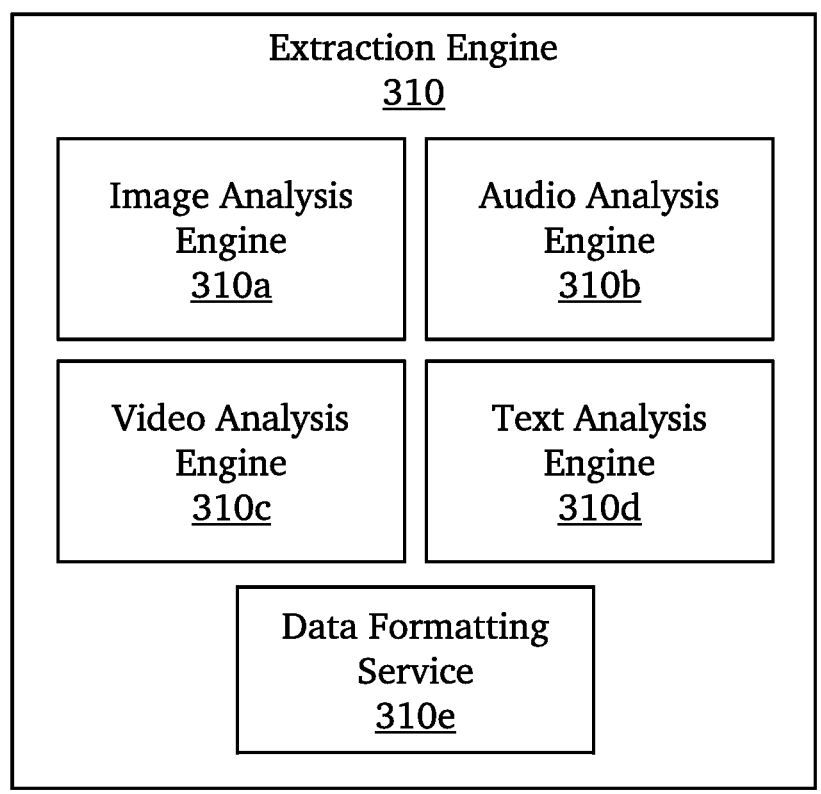
FIG. 4 is a block diagram of an exemplary extraction engine according to various embodiments of the invention.

Referring to FIG. 4, extraction engine 310 may comprise an image analysis engine 310*a*, an audio analysis engine 310*b*, a video analysis engine 310*c*, a text analysis engine 310*d*, and data formatting service 310*e*. Image analysis engine 310*a* may be configured to analyze images using image recognition models. Images may include, but is not limited to, pictures, charts and graphs, tables, and the like. Data from images may be extracted and may then processed by data formatting service 310*e*, so that the data may conform to any preset standards for usage in a knowledge base.

Audio analysis engine 310*b* may be configured to use audio analysis models to process audio data, for example, performing general speech-to-text operations or to analyze tonal cues in voice recordings. This may provide additional insight by cross referencing the tones and inflections with presented facts, for example, it may reveal whether or not certain statements can be considered truthful or not. Data extracted from audio may then be processed by data formatting service 310*e*, so that the data may conform to any preset standards for usage in a knowledge base.

Video analysis engine 310*c* may be configured to use video analysis models to process videos, and capture information from videos. For example, analyzing body language to glean concealed information or perform lip-reading analysis as a means to increase accuracy of speech dictation.

Text analysis engine 310*d* may be configured to use natural language processing (NLP) models to analyze text-based data, which may include, system logs, news articles, blog posts, tabular data, and the like. Text analysis engine 310*d* may contain an extensible collection of parsers that may be utilized to parse text data in a known format.

Data formatting service 310*e* may be configured to user graph stack service 145 to clean and formalize data gathered by other processes of extraction engine 310 and convert the data into a graph representation to ensure that the data conforms to any preset standards for compatibility with knowledge bases that are in use by system 300.

Knowledge base construction service 320 may be configured to assemble and maintain extracted and processed data. Knowledge bases may be divided in context collections provided by a user, for example, a knowledge base may be based on a particular company, a technical field of interest, financial data, and the like. As new data is extracted and processed, KBC service 320 may update existing knowledge bases with the newly extracted data, or create a new knowledge base if a suitable knowledge base doesn't exit. Knowledge bases may be stored in system 300 in data store 330. In some embodiments, knowledge bases may also be actively monitored and evaluated, for example, by using DCG module 155 with the associated transformer modules 150, 160 and observation and state estimation service 140, to locate information originating from multiple sources that, when evaluated collectively, are valuable. For example, using forward analysis on a particular knowledge base, the detection of data exfiltration may be unearthed. Personally Identifiable Information (PII) encodings, such as name, phone number, and address collectively may constitute a Data Loss Prevention breach under some jurisdictions, and a Universal Unique Identifier (UUID) associated with each of these three pieces of info are sent separately to the same recipient, this approach will identify that all three were sent based upon enrichment and ongoing analysis of the knowledge base.

Based on some competitor positioning, one very important use case that I want to make sure that we capture here is the idea of enabling a distributed Data Loss Prevention (DLP) capability. Effectively, using forward analysis (aggregating data together in a unified data model like a knowledge graph), our extraction capability can detect unwanted data exfiltration through analytics. For example, consider Personally Identifiable Information (PII) encodings where name/phone number/address all together constitute a DLP breach (the US gov and others think in these terms about PII violations in terms of such specific correlations) and a UUID paired with each of these three pieces of info are sent separately to the same source, this approach will identify that all three were sent based upon enrichment of the knowledge graph.

Proxy connection service 321 may be configured to automatically connect to a proxy network to facilitate anonymous connections to data sources. This may be useful in cases, for instance, in which a particular data source aggressively blocks web crawlers from accessing pages, when bypassing a firewall is required, to conceal one's true identity, and the like. Proxy connection service 321 may automatically determine when a proxy connection is required and may automatically determine optimal proxy networks to use.

Phase transition analyzer 322 may be configured to use DCG module 155 along with the associated transformer modules 155 to analyze graph and time-series data for shifts and changes in data over time, for example, changes in lingo in a particular field or development that changes understanding of a subject overtime. This may provide useful, for instance, when considering data sources from particular time periods, especially if the field of interest has undergone significant change over time.

Figure 5:
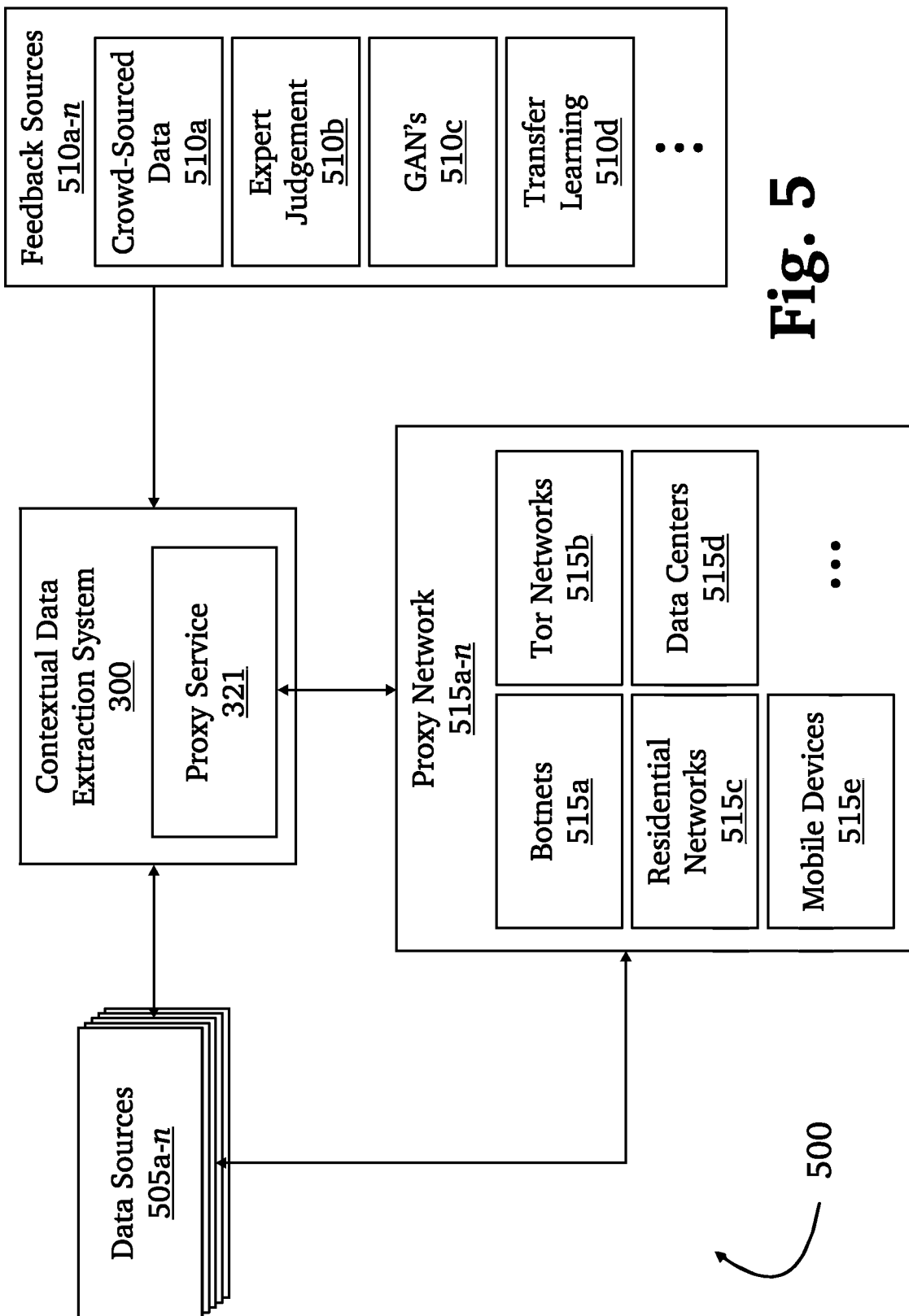
FIG. 5 is a block diagram of an exemplary system employing a system for contextual data extraction according to various embodiments of the invention.

FIG. 5 is a block diagram of an exemplary system 500 employing a system for contextual data extraction 300 according to various embodiments of the invention. System 300 may connect to a plurality of data sources 505a-n, which may comprise richly formatted data sources, structured data sources, unstructured data sources, system logs, repositories, and the like. In some instances, data sources 505a-n may require connection via one or more proxy networks 515a-n, which may comprise botnets 515a, TOR networks 515b, residential networks 515c, data centers 515d, and mobile devices 515e. System 300 may also take into consideration feedback from a plurality of feedback sources 510a-n, which may include, crowd-sourced data 510a, expert judgement 510b, generative adversarial networks (GAN's) 510c, transfer learning 510d, and the like as a means for quality assurance for extracted data.

Detailed Description of Exemplary Aspects

Figure 6:
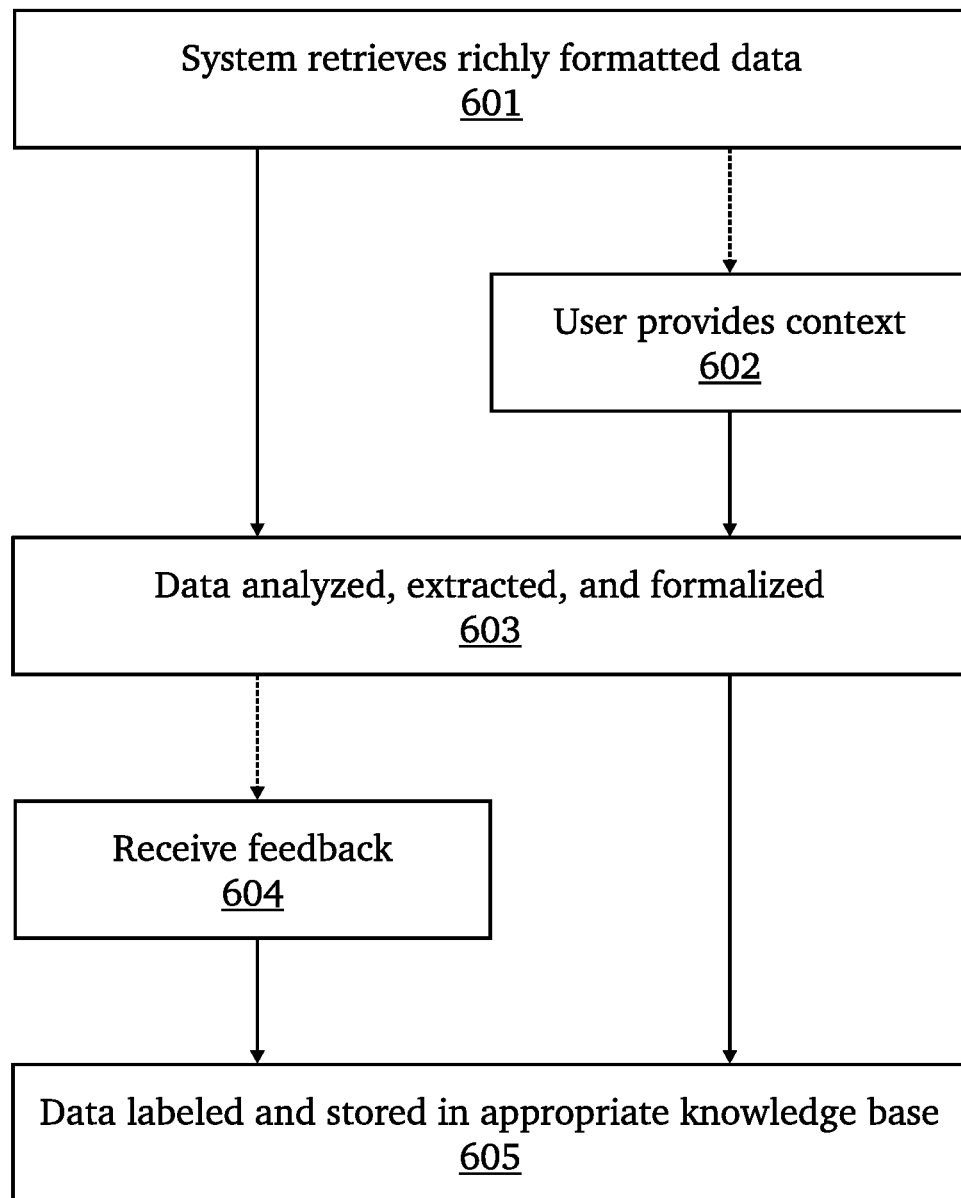
FIG. 6 is a flow diagram illustrating a method for knowledge base construction according to various embodiments of the invention.

FIG. 6 is a flow diagram illustrating a method 600 for knowledge base construction according to various embodiments of the invention. At an initial step 601, system 300 retrieves richly formatted data from a plurality of sources, which may include, local storage, cloud storage, web pages, and the like. At an optional step 602, a user may provide the system with context to refine types of data that are extracted, for instance, financial data for a particular company. At step 603, the system analyzes the richly formatted data using the various functions of extraction engine 310, extracts the relevant information, and formalizes the data. At another optional step 604, the system may receive feedback regarding the data from a variety of sources, a few of which are disclosed above in FIG. 5. At step 605, the data is labeled, and stored in an appropriate knowledge base. If no knowledge base exists, the system may create a new knowledge base to store the data.

Figure 7:
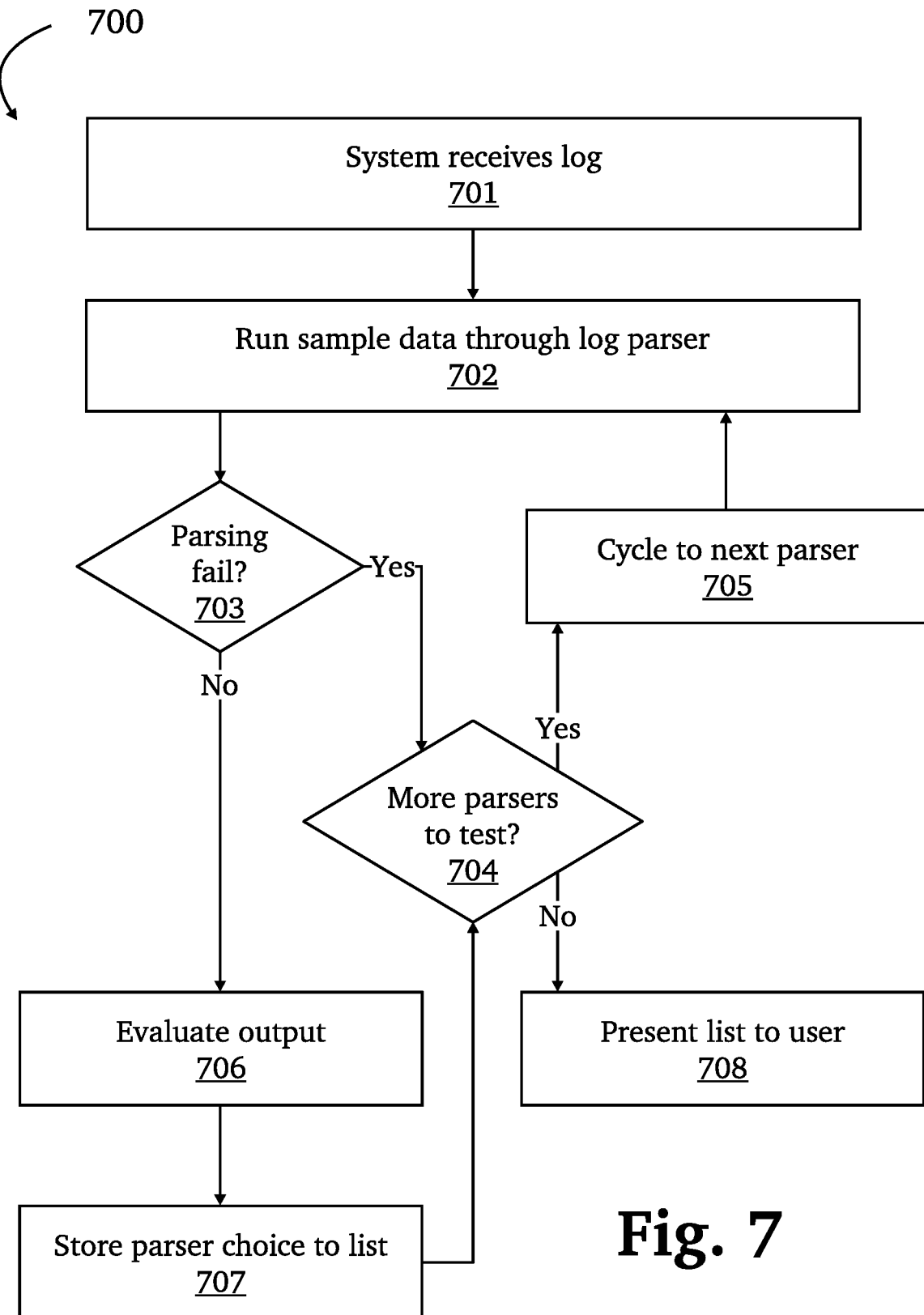
FIG. 7 is a flow diagram illustrating a method for parser testing according to various embodiments of the invention.

FIG. 7 is a flow diagram illustrating a method 700 for parser testing according to various embodiments of the invention. At an initial step 701, system receives a log from services commonly used in the art, for example, system logs from APACHE, NGINX, M, CISCO ASA, SQUID, BLUECOAT, PALOALTONETWORKS, and the like. At step 702, the log is tested with a first log parser. If the log is of substantial size, a portion of the log may be used to test the parser. At decision block 703, if the system determines that the parsing has failed with the first parser, for example, if the output is incorrect, the system checks to see if there are anymore parsers to test at decision block 704. If there are more parsers, a second parser may be selected at step 705. The testing process starts again with the second parser. If there are no more parsers at decision block 704, a list of parsers that passed is presented to the user at step 708, and the user may pick one or more parsers for the system to use. The system may dynamically arrange the parsers in a particular order, for example, based on a score automatically generated by the system for the quality and usefulness the output is determined to be by the system. In some embodiments, a threshold may be preset so that if a quality score surpasses the threshold, the system automatically parsers to parse the logs.

Returning to decision block 703, if the parsing provides a suitable output, the system further evaluates the output at step 706 to determine the quality and usefulness of the output. The output may also be scored at this step. At step 707, the present parser choice is stored on a list to be presented to the user at step 708, along with a store.

Figure 8:
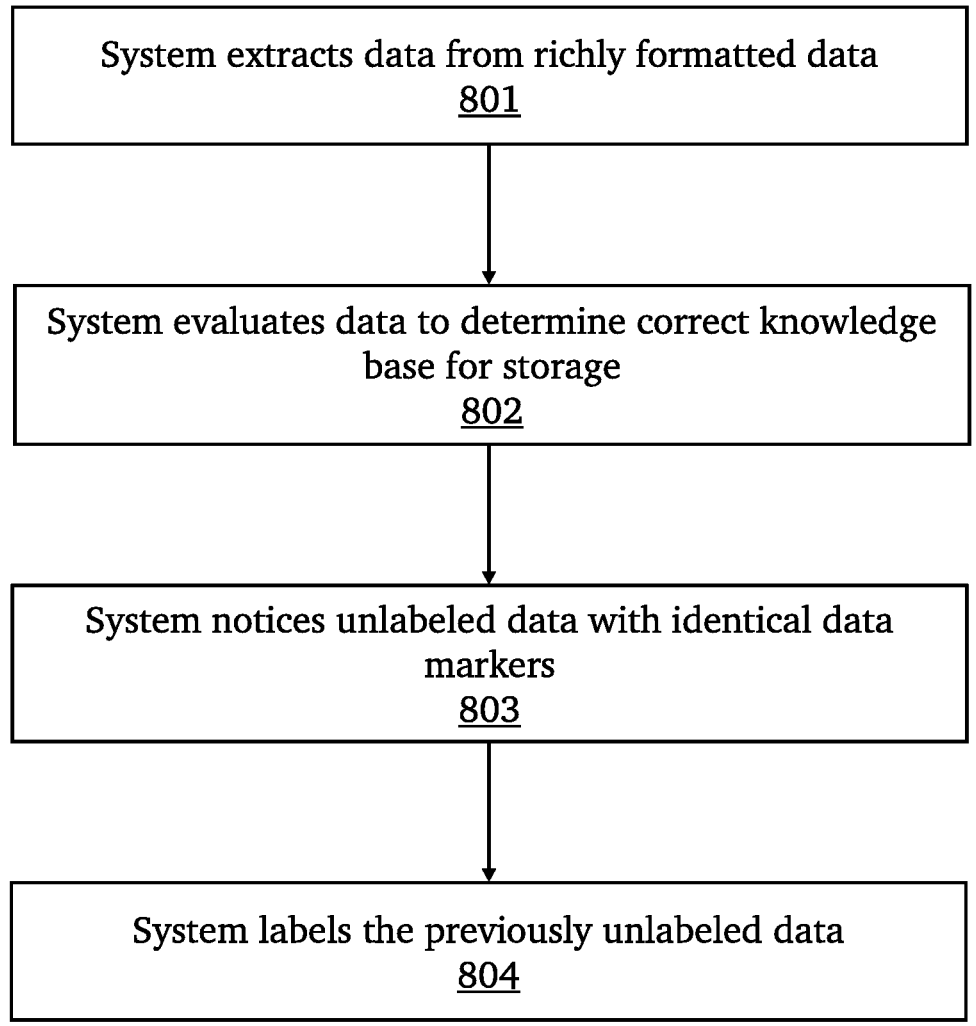
FIG. 8 is a flow diagram illustrating a method for utilizing data fingerprinting to match unlabeled data according to various embodiments of the invention.

FIG. 8 is a flow diagram illustrating a method 800 for utilizing data fingerprinting to match unlabeled data according to various embodiments of the invention. At an initial step 801, system 300 extracts data from a source of richly formatted data. At step 802, the system determines which knowledge base to the store the extracted data. At step 803, during the knowledge base search, the system discovers a knowledge base with unlabeled and incomplete data that contains identical data markers. At step 804, the previously unlabeled data is labeled, and may be moved to an appropriate knowledge base.

To provide an example, previously unlabeled financial information containing incomplete stock pricing may be matched with historical stocks pricing of a known company during known time-periods. The system may automatically associate the two bodies of data during graph analysis of the datasets. The system may then populate the incomplete dataset with any additional information, label the data, fixed any mislabeling, and the like.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 9:
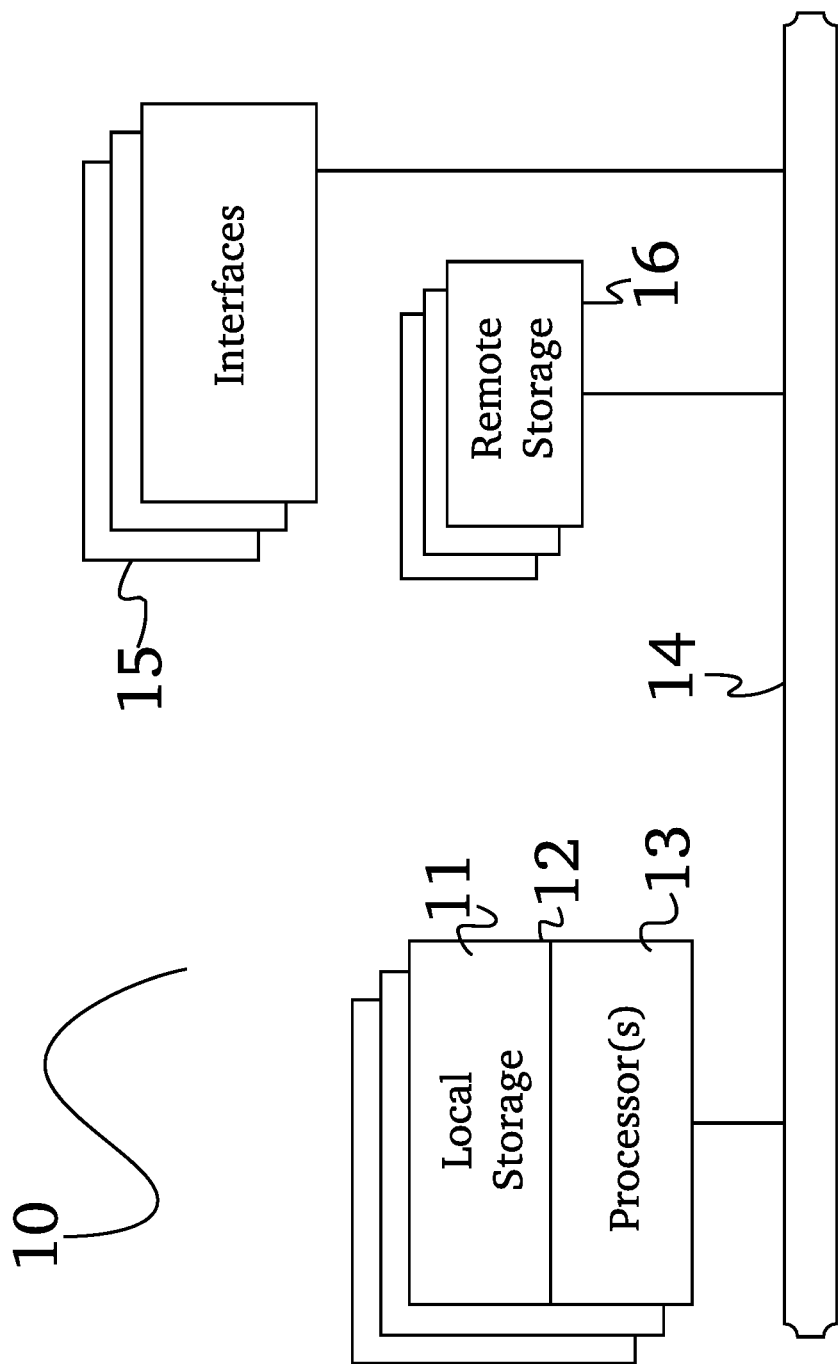
FIG. 9 is a block diagram illustrating an exemplary hardware architecture of a computing device used in various embodiments of the invention.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
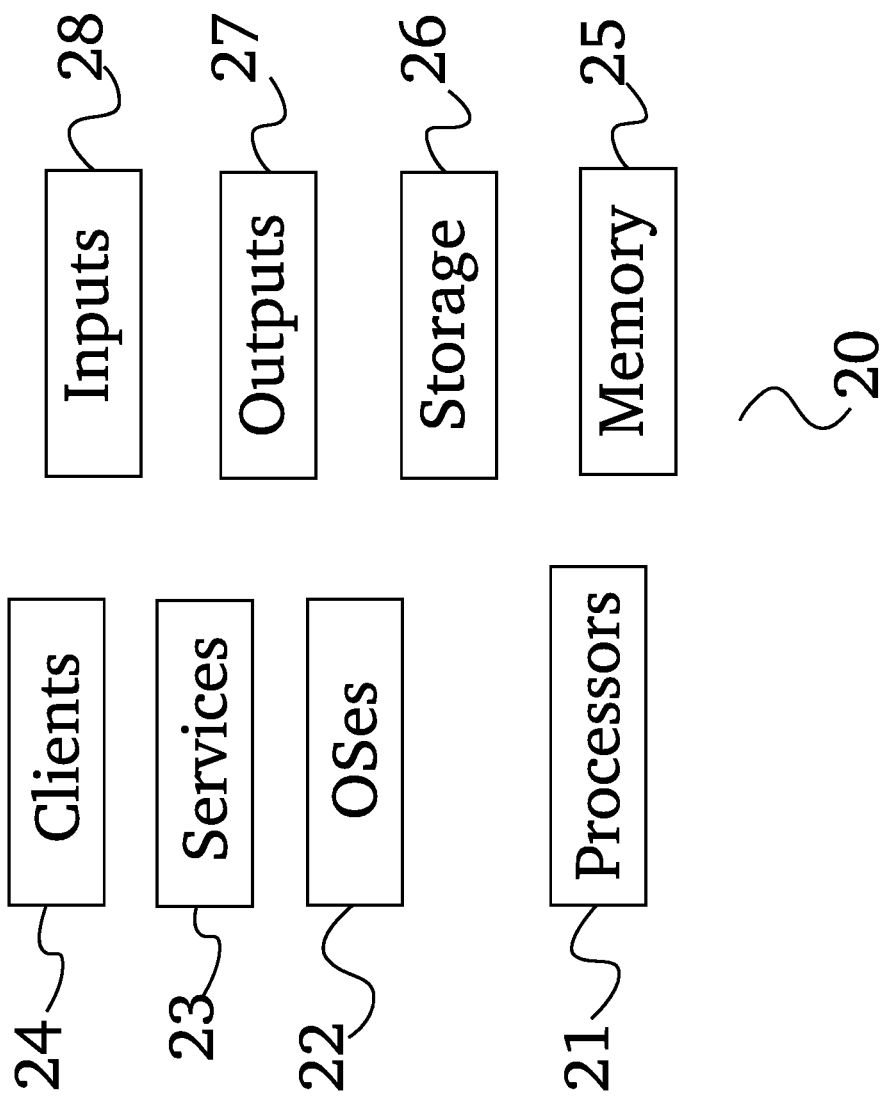
FIG. 10 is a block diagram illustrating an exemplary logical architecture for a client device, according to various embodiments of the invention.

In some aspects, systems may be implemented on a standalone computing system. Referring now to FIG. 10, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

Figure 11:
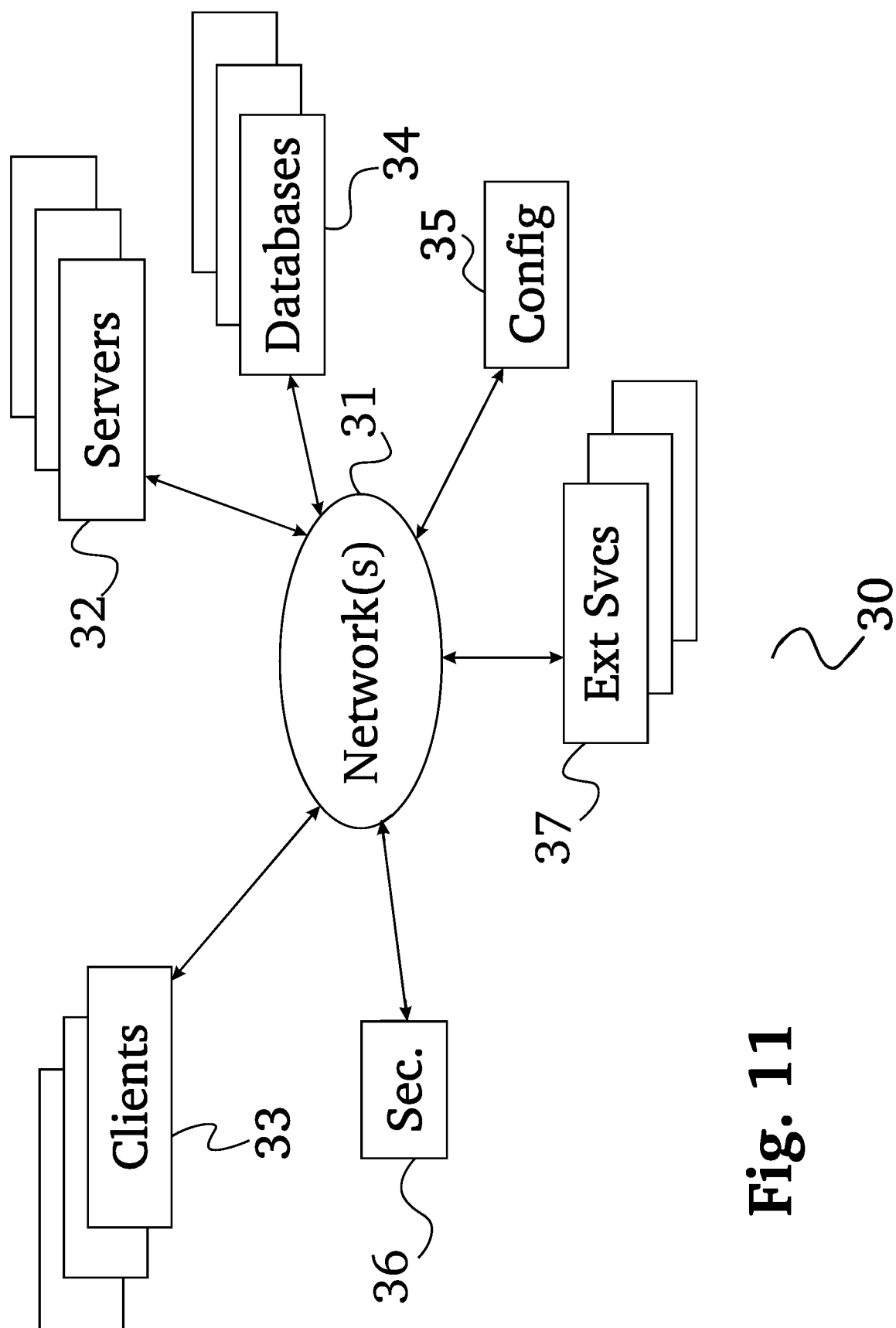
FIG. 11 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 11, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call.

Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 12:
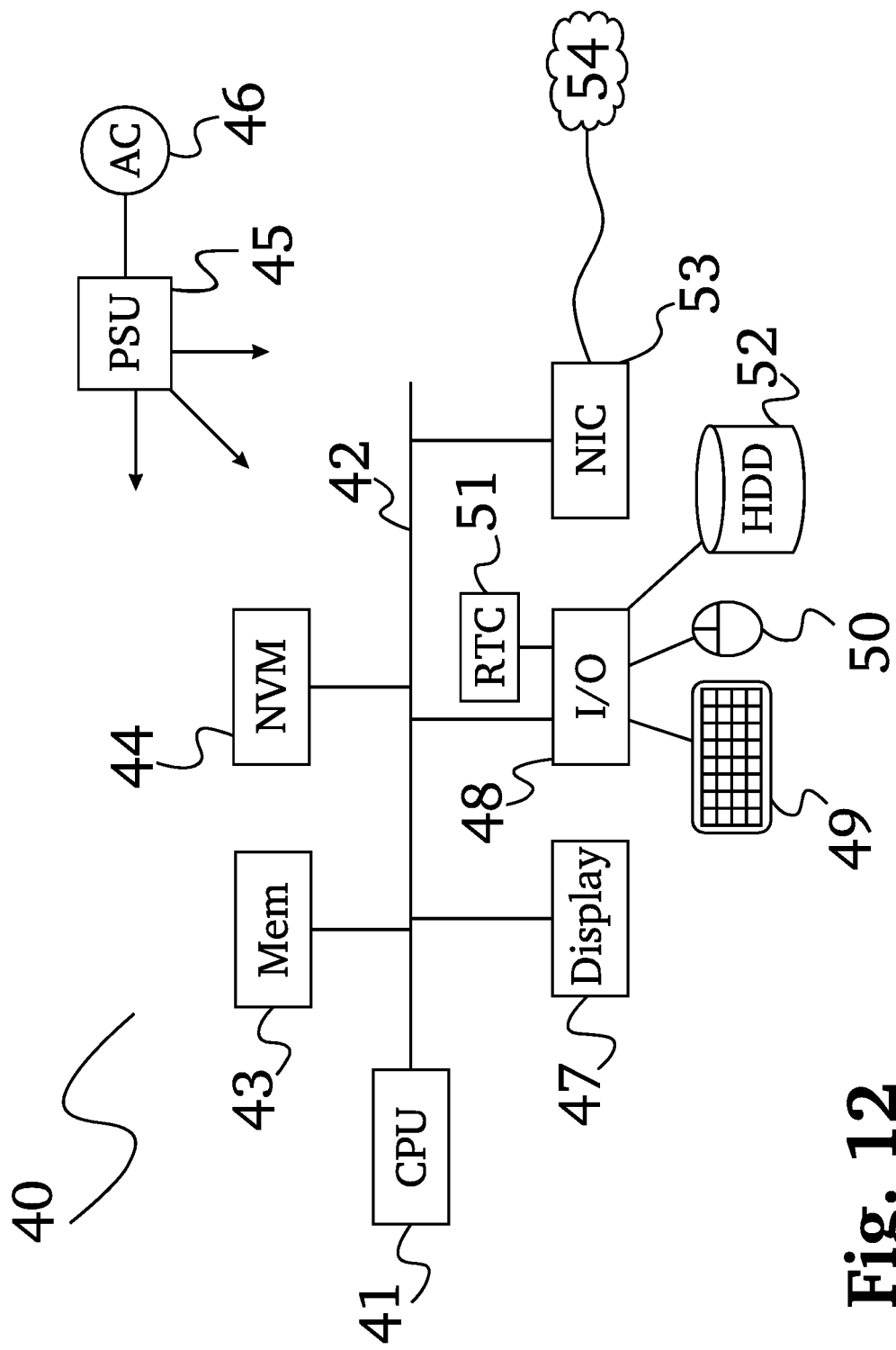
FIG. 12 is another block diagram illustrating an exemplary hardware architecture of a computing device used in various embodiments of the invention.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for automated scalable contextual data collection and extraction, comprising:
a computing device comprising a memory, a processor, and a non-volatile data storage device;
an extraction engine comprising a first plurality of programming instructions stored in the memory and operable on the processor, wherein the first plurality of programming instructions, when operating on the processor, cause the computing device to:
receive a formatted dataset for analysis;
receive a context in which to analyze the formatted dataset;
extract structural information from the formatted dataset
associate the structural information with the context; and
store the formatted dataset, the context, the structural information, and the associations in the non-volatile data storage device; and
a knowledge base construction service comprising a second plurality of programming instructions stored in the memory and operable on the processor, wherein the second plurality of programming instructions, when operating on the processor, cause the computing device to:
retrieve the retrieve the formatted dataset, the context, the structural information, and the associations from the non-volatile data storage device;
create a knowledge graph comprising relationships among the formatted dataset, the context, the structural information, and the associations; and
store the knowledge graph in the non-volatile data storage device.

2. The system of claim 1, wherein a previously created knowledge graph is retrieved to store newly extracted information.

3. The system of claim 1, wherein data extracted from a first modality is be used to augment data in a second modality.

4. The system of claim 1, further comprising a proxy connection service comprising a third plurality of programming instructions stored in the memory and operable on the processor, wherein the third plurality of programming instructions, when operating on the processor, cause the computing device to:
   determine that an intermediate proxy connection is required based at least in part on connection status in connecting to a data source.

5. The system of claim 4, wherein the proxy connection service determines an optimal proxy network to use as the intermediate proxy connection based at least on successfully connecting to a target data source.

6. The system of claim 1, wherein a data marker in labeled data is used by the system to identify and label previously unlabeled similar data.

7. The system of claim 1, further comprising a phase transition analyzer comprising a fourth plurality of programming instructions stored in the memory and operable on the processor, wherein the fourth plurality of programming instructions, when operating on the processor, cause the computing device to:
   retrieve a knowledge graph from the data store; and
   perform a plurality of graph analysis and transformations on the knowledge graph to identify data transitions over time.

8. The system of claim 1, wherein a previously created knowledge graph is monitored for unwanted data exfiltration.

9. A method for automated scalable contextual data collection and extraction, comprising the steps of:
   receiving a formatted dataset for analysis;
   receiving a context in which to analyze the formatted dataset;
   extracting structural information from the formatted dataset; and
   associating the structural information with the context; and
   storing the formatted dataset, the context, the structural information, and the associations in a non-volatile data storage device;
   creating a knowledge graph comprising relationships among the formatted dataset, the context, the structural information, and the associations; and
   storing the knowledge graph in the non-volatile data storage device.

10. The method of claim 9, wherein a previously created knowledge graph is retrieved to store newly extracted information.

11. The method of claim 9, wherein data extracted from a first modality is be used to augment data in a second modality.

12. The method of claim 9, further comprising the step of determining that an intermediate proxy connection is required based at least in part on connection status in connecting to a data source.

13. The method of claim 12, further comprising the step of determining an optimal proxy network to use as the intermediate proxy connection based at least on successfully connecting to a target data source.

14. The method of claim 9, further comprising the step of labeling data used by the system to identify and label previously unlabeled similar data.

15. The method of claim 9, further comprising the steps of:
   retrieving a knowledge graph from the data store; and
   performing a plurality of graph analysis and transformations on the knowledge graph to identify data transitions over time.

16. The method of claim 9, further comprising the step of monitoring a previously created knowledge graph for unwanted data exfiltration.

* * * * *